United States Patent [19]

Kazmark et al.

[11] Patent Number: 5,024,458
[45] Date of Patent: Jun. 18, 1991

[54] PORTABLE LUGGAGE CARRIER WITH PIVOTABLE WHEELS

[76] Inventors: Eugene A. Kazmark, 5 Remin La.; Eugene A. Kazmark, Jr., 506 Manhattan Rd., both of Joliet, Ill. 60433

[21] Appl. No.: 476,311

[22] Filed: Feb. 7, 1990

[51] Int. Cl.⁵ .............................................. B62B 1/12
[52] U.S. Cl. ................... 280/645; 280/655; 280/47.18; 280/47.21; 280/47.29
[58] Field of Search ............ 280/645, 654, 655, 47.21, 280/47.29, 43.1, 38, 641, 43.24, 47.18, 47.33

[56] References Cited

U.S. PATENT DOCUMENTS

| | | | |
|---|---|---|---|
| 3,998,476 | 12/1976 | Kazmark, Sr. | 280/655 |
| 4,346,907 | 8/1982 | Swann | 280/47.29 X |
| 4,546,995 | 10/1985 | Kassai | 280/655 |
| 4,591,183 | 5/1986 | Gordon et al. | 280/655 |
| 4,630,837 | 12/1986 | Kazmark | 280/47.2 |
| 4,777,751 | 10/1988 | Pasquale | 280/655 X |
| 4,865,346 | 9/1989 | Garlile | 280/655 X |

FOREIGN PATENT DOCUMENTS

| | | | |
|---|---|---|---|
| 598361 | 5/1960 | Canada | 280/645 |
| 2530569 | 1/1984 | France | 280/47.21 |
| 398441 | 9/1933 | United Kingdom | 280/47.21 |
| 1357157 | 6/1974 | United Kingdom | 280/655 |

Primary Examiner—Andres Kashnikow
Assistant Examiner—Brian L. Johnson
Attorney, Agent, or Firm—Tilton, Fallon, Lungmus & Chestnut

[57] ABSTRACT

A portable luggage carrier includes a handle member and a base member pivotally connected to the handle member for supporting luggage. An axle pivotally mounted to the handle member supports a pair of wheels which lie on opposite ends of the axle, rotatably mounted to the axle. Latching devices releasably secure the axle in predetermined positions.

12 Claims, 2 Drawing Sheets

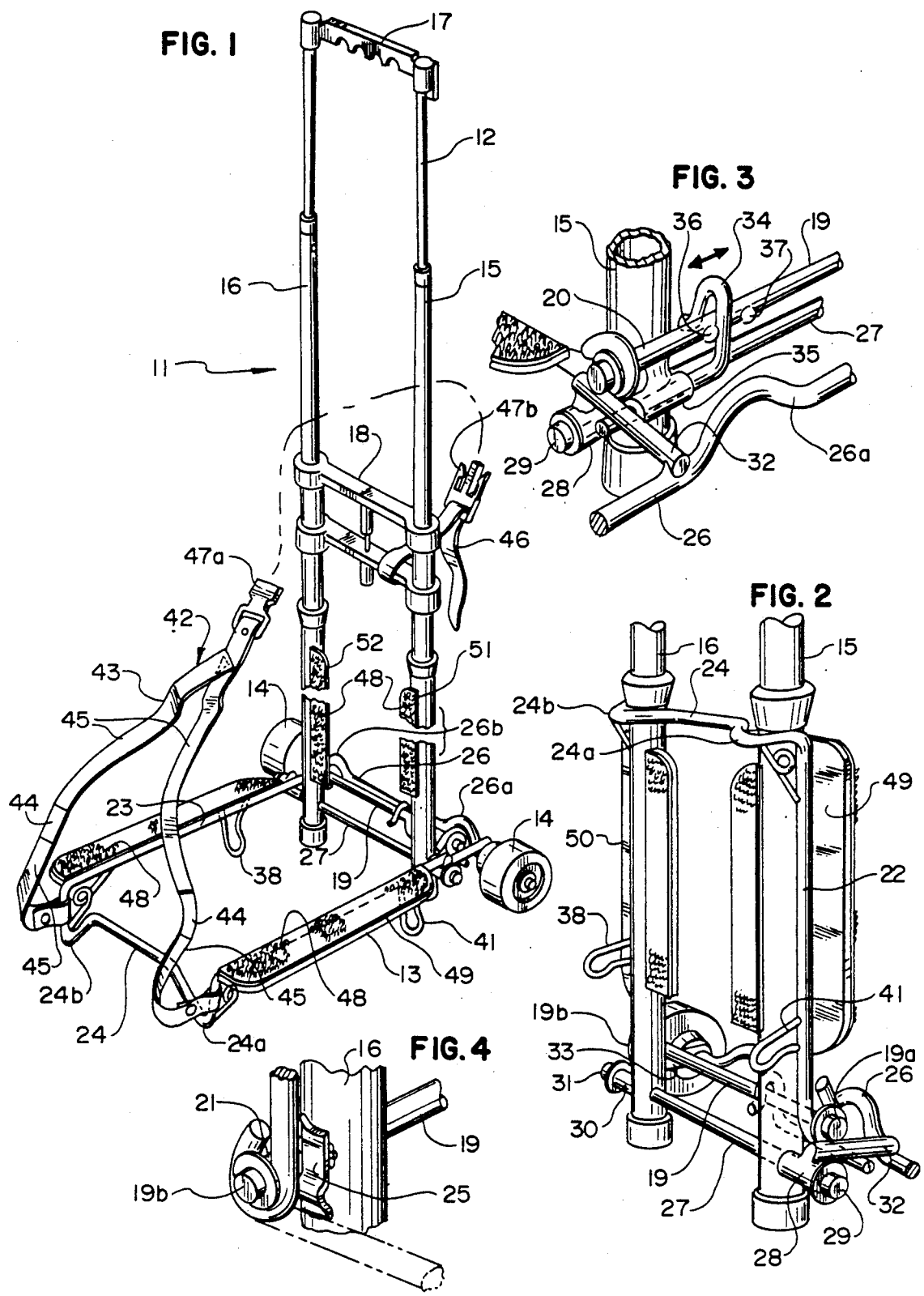

PORTABLE LUGGAGE CARRIER WITH PIVOTABLE WHEELS

BACKGROUND OF THE INVENTION

1. Field Of The Invention

The present invention relates to a portable luggage carrier and more particularly to a portable luggage carrier including pivotable wheels which a user may move to predetermined positions.

2. Description Of The Prior Art

A portable luggage carrier of the type described in Kazmark, Sr. U.S. Pat. No. 3,998,476 includes a handle member comprising a pair of collapsible or telescoping tube assemblies. The carrier also includes a luggage supporting base member pivotally connected to the handle member and movable between a storage position and a luggage supporting position. In addition, this carrier includes a pair of wheels rotatably mounted to the handle member for allowing the luggage carrier to roll on a subtending surface.

The wheels of the prior luggage carriers lie at a fixed, predetermined position. Typically, the wheels lie on one side of the handle member opposite the side on which the carrier receives luggage. There, the wheels may easily engage the subtending surface; however, they prevent easy storage of the carrier.

The portable luggage carrier of the present invention includes wheels which pivot from a first operable position on one side of the luggage carrier's handle member to the other opposite side of the handle member. They allow a user to place the luggage carrier in a stable, standing position. They also allow a user to collapse the luggage carrier to a compact configuration for easy storage.

SUMMARY OF THE INVENTION

In accordance with one embodiment of the present invention, a portable luggage carrier includes a handle member with a pair of parallel telescoping tubes. The handle member includes a grip portion disposed between the two tubes at one end of the tubes. A user grasps this grip to manipulate and control the carrier.

The portable luggage carrier also includes a base member disposed at the opposite end of the handle member, pivotally mounted to the handle member. A user may move the base member between a storage position in which it lies generally parallel to the handle member and a luggage supporting position in which it lies generally perpendicular to the handle member.

The portable luggage carrier rides on a pair of wheels disposed at the second end of the handle member and rotatably mounted on an axle. A pivot connection pivotally secures the axle to the second end of the handle member. The axle pivots from one side of the handle member to the other by moving below the bottom end of the handle member.

A first latching device disposed proximate the axle releasably secures the axle at a first position where the wheels may engage the subtending surface and allow a user to roll the carrier on the surface. A second latching device releasably secures the axle at a second position below the base member to allow the carrier to stand in a stable position while supporting luggage disposed on the base member. A third latching device releasably secures the axle in a storage position.

The portable luggage carrier includes a strap for securing the luggage to the base member. This strap includes strips of elastic and inelastic material. The elastic strips allow the strap to accommodate a variety of luggage of different sizes. These strips are substantially shorter than the strips of inelastic material.

Finally, the portable luggage carrier includes hook and loop strips secured to the base member and to the handle member at its second end. These strips cooperate with corresponding hook and loop strips on luggage which a user may place on the carrier. The strips further secure the luggage on the carrier.

BRIEF DESCRIPTION OF THE DRAWINGS

For a more complete understanding of this invention, one should now refer to the embodiment illustrated in greater detail in the accompanying drawings and described below by way of an example of the invention.

In the drawings:

FIG. 1 is a perspective view of the portable luggage carrier of the present invention;

FIG. 2 is a partial perspective view of the bottom end of the luggage carrier, showing the base member of the carrier disposed in a closed or storage position;

FIG. 3 is a partial perspective view of the carrier, showing the connection between the handle member and the base member and the connection between the handle member and the axle which supports the wheels of the carrier;

FIG. 4 is a partial perspective view of the carrier, showing the connection between the handle member and the base member and the device which releasably secures the base member in a storage position;

Figure 5:
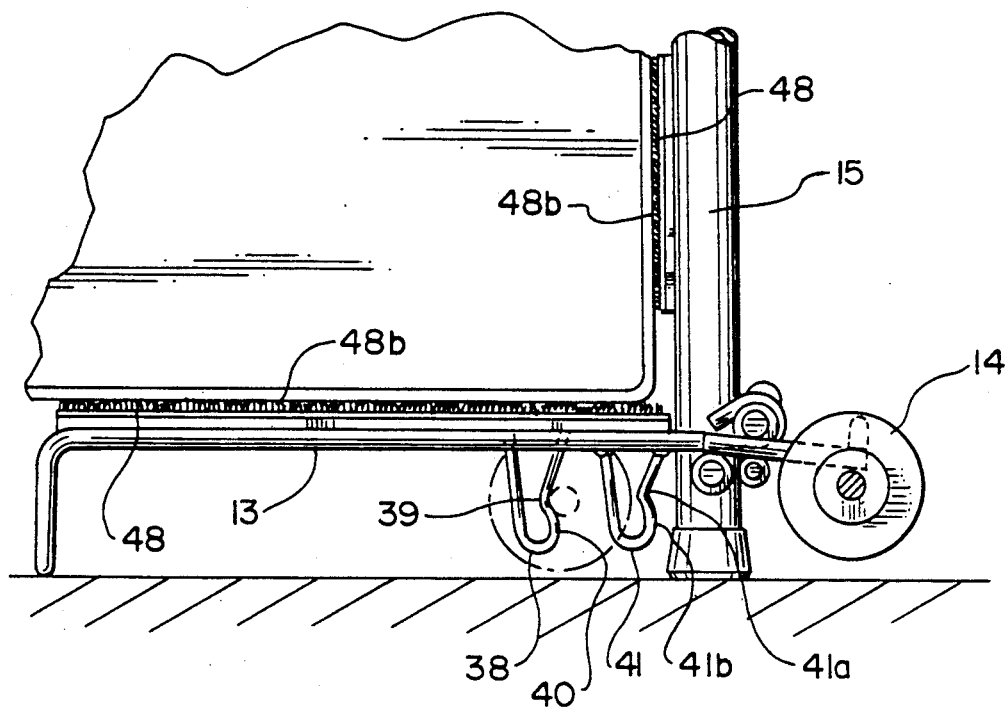
FIG. 5 is a side elevation view of the bottom end of the luggage carrier showing the base member in the luggage supporting position and the wheels in a first, operable position.

While the following disclosure and the drawings describe the invention in connection with one embodiment, one should understand that the invention is not limited to this embodiment. Further, one should understand that the drawings are not to scale and that diagrammatic representations, and fragmentary views illustrate, in part, the embodiment. In certain instances, the disclosure may not include details which are not necessary for an understanding of the present invention, such as conventional details of fabrication and assembly.

DETAILED DESCRIPTION OF THE DRAWINGS AND AN EMBODIMENT

Turning now to the drawings, FIG. 1 illustrates a portable luggage carrier 11 which generally includes a handle member 12, a base member 13, and a pair of wheels 14. The handle member 12 includes a pair of collapsing or telescoping metal tubes 15 and 16 disposed parallel to each other, a predetermined distance apart. A plastic hand grip 17 connects the first, upper ends of the tube assemblies. A user grasps this grip to manipulate the portable luggage carrier and move it along a subtending surface.

The handle member 12 also includes a release bar assembly 18. By operating this assembly 18 and pushing down on the hand grip 17, a user of the portable luggage carrier may collapse the tube assemblies. U.S. Pat. No. 3,998,476, issued Dec. 21, 1976 and entitled "Portable Luggage Carrier With Telescoping Handle", discloses the handle member in greater detail; and the applicant incorporates the disclosure of that patent to the present disclosure by this reference.

The base member 13 is a channel-shaped metal bar with its ends bent around a metal axle or a cross-bar 19 which lies welded or otherwise fixedly secured to the bottom, second end of each tube assembly 15 and 16 (See FIGS. 2-4). The cross-bar 19 defines a pivot axis for the base member 13. It extends between the two tube assemblies 15 and 16; and one of its end portions 20 extends outwardly from the tube assembly 15 while the other end portion 21 extends outwardly from the other tube assembly 16. Each end portion supports one end of the bar which forms the base member 13. Cap-like stops 19a and 19b disposed in a press-fit or otherwise secured onto the distal ends of the bar 19 prevent the base member 13 from moving off of the bar 19.

The base member 13 includes arm portions 22 and 23 and a cross-portion 24. The arm portions extend parallel to each other, a predetermined distance apart; and the bottom or second end of the handle member 12 extends between them. The cross-portion 24 includes U-shaped bends 24a and 24b at its ends. These bends extend perpendicularly to the arm portions and receive corresponding portions of the tube assemblies 15 and 16 when the base member 13 lies in a storage position as shown in FIG. 2. In this position, the bend 24a engages the tube assembly 15; and the bend 24b l engages the tube assembly 16.

A resilient metal strip 25 (See FIG. 4) fixedly secured (e.g., welded) to the tube assembly 16 releasably secures the base member 13 in the position shown in FIG. 2. This strip defines a protuberance which the arm 23 overrides when moving to or from this position.

The wheels 14 lie rotatably mounted on opposite ends of an axle 26. This axle lies parallel to a cross-bar 27 which extends between the tube assemblies 15 and 16, through openings in the assemblies. The bar 27 provides a pivot axis for the axle 26, an axis which lies perpendicularly to the longitudinal axes of the tube assemblies 15 and 16. Although the bar 27 extends through the tube assemblies 15 and 16, it may alternatively lie along either side of the tube assemblies, welded or otherwise secured to them.

One of the end portions of the bar 27 extends outwardly of the tube assembly 15 and supports a tube segment 28 which lies rotatably mounted around the end portion. The tube segment 28 lies between the tube assembly 15 and a cap-like stop 29 disposed in a press-fit onto the end of the bar 27. The opposite end portion of the bar 27 extends outwardly of the tube assembly 16 and similarly supports a tube segment 30 between a stop 31 and the tube assembly 16.

A connecting bar 32 connects the tube segment 28 and one end of the axle 26. Similarly, a connecting bar 33 connects the tube segment 30 and the other end of the axle 26. Weld connections or other similar connections fixedly secure one end of each connecting bar to the corresponding tube segment and the other end to the axle 26. As described above, the tube segments 28 and 30 and the connecting bars 32 and 33 provide a pivot connection between the axle 26 and the cross-bar 27.

Figure 6:
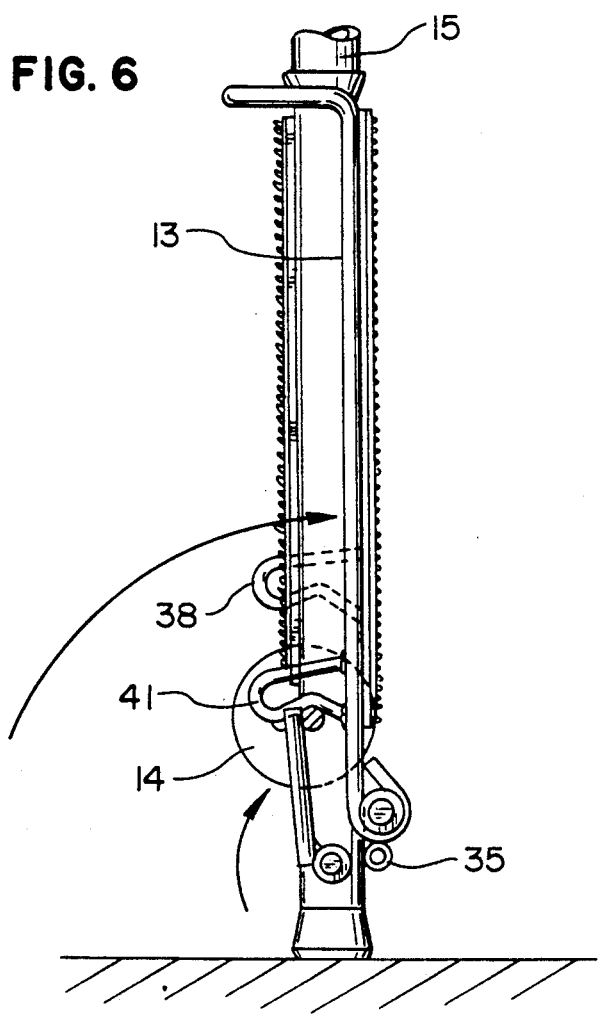
FIG. 6 is a side elevation view of the bottom end of the luggage carrier showing the base member and the wheels in a storage position.

The axle 26 and the wheels 14 pivot around the bottom of the handle member 12 approximately 270° as shown in FIGS. 5 and 6. The distal ends of the bar 19 act as stops for the connecting bars 32 and 33, preventing counterclockwise rotation beyond the point shown in FIG. 5. The tube assemblies 15 and 16 act as a stop for the axle 26, preventing clockwise rotation beyond the point shown in FIG. 6. The axle 26 includes bends 26a and 26b with a shape which corresponds to the rounded shape of the tubes of the tube assemblies. These bends receive the tubes and facilitate a compact arrangement of the carrier components for storage, as do the bends 24a and 24b of the base member 13.

A latching bar 34 (or first latching member) releasably secures the axle in the first position shown in FIGS. 1-3 and 5. In this position, the wheels 14 may engage a subtending surface and allow a user to roll the carrier over the surface. The latching bar 34 lies in sliding engagement with a tube segment 35 and the bar 19 (See FIG. 3) One end of the latching bar 34 extends around the bar 19 and engages a pair of knobs 36 and 37 which define the limits of movement for the latching bar. The other end of the latching bar 34 extends through the central opening of the tube segment 35 which lies fixedly secured (e.g., welded) to the bottom end of the tube assembly 15 proximate the connecting bar 32.

When placed in the position shown in FIG. 3, the latching bar 34 secures the connecting bar 32 between it and the end of the bar 19. When placed against knob 37, the latching bar 34 does not engage the connecting bar 32 but allows the axle 26 to pivot about bar 27.

To releasably secure the wheels 14 at a second position (as shown in phantom in FIG. 5), the carrier 11 includes a resilient, metal latching loop 38 (or first latching member). This loop 38 is an elongate metal wire formed into a V-shaped member and welded or otherwise fixedly secured at both of its ends to the arm portion 23 of the base member 13. When the base member lies in a standing, luggage supporting position as shown in FIG. 5, the latching loop 38 extends downwardly towards the subtending surface. It includes a bend 39 for receiving the axle 26 after the axle has overridden a bend 40.

Finally, the luggage carrier includes a third latching member 41 which releasably secures the axle 26 in the position shown in FIG. 6. In this position, the axle extends across the handle member 12 and engages the tube assemblies 15 and 16. The member 41 is a metal loop made of metal wire and welded or otherwise fixedly secured at both of its ends to the arm portion 22 of the base member 13. It has a shape similar to that of the loop 38.

When the base member lies in a folded storage position as shown in FIGS. 2 and 6, the third latching member 41 extends generally perpendicularly to the tube assembly 15. In this position, the third latching member 41 receives the axle 26 in a bend 41a after the axle overrides another bend 41b formed into the third latching member. As shown in FIG. 6, the pivot axis for the axle 26 and the base member 13 lie spaced apart. Thus, a user cannot move the base member out of the position shown in FIG. 6 without first disengaging the axle 26 from the latching member 41.

A strap 42 releasably secures the luggage to the carrier 11 (See FIG. 1). This strap includes a first, V-shaped section 43 including strips of elastic material 44 fixedly secured in end-to-end relation with inelastic strips of material 45. The elastic strips 44 allow the strap to accommodate a variety of luggage of different sizes. These strips are substantially smaller than the strips of inelastic material 45. The strap also includes a second section 46 made from a strip of inelastic material. A female buckle member 47a on section 43 cooperates with a male buckle member 47b on section 46 to releasably secure the two sections 43 and 46 together.

Hook and loop type strips 48, adhered or otherwise secured to the base member 13 and to the handle member 12 at its second end, also help secure the luggage to the carrier. These strips cooperate with corresponding hook and loop strips 48b on luggage. A pair of elongate metal strips 49 and 50 welded to the outer edges of the arm portions 22 and 23, respectively, of the base member 13 and a second pair of elongate metal strips 51 and 52 welded to the bottom ends of the tube assemblies 15 and 16, respectively, support these hook and loop strips 48.

While the above description and the drawings disclose and illustrate one embodiment, one should understand, of course, that the invention is not limited to this embodiment. Those skilled in the art to which the invention pertains may make modifications and other embodiments employing the principles of this invention, particularly upon considering the foregoing teachings. Therefore, by the appended claims, the applicant intends to cover any such modifications and other embodiments as incorporate those features which constitute the essential features of this invention.

What is claimed is:

1. A portable luggage carrier comprising: a handle member having a first and second end; a grip means disposed at the first end of the handle member; a base member pivotally mounted on the handle member at the second end of the handle member for supporting luggage; wheel means disposed at the second end of the handle member for rolling on a subtending surface; axle means disposed at the second end of the handle member for supporting the wheel means, said axle means defining an axis of rotation for the wheel means; connecting means for connecting the axle means to the handle member and for pivoting the axle means to a plurality of positions relative to the handle member and movable first latching means secured to the second end of the handle member for engaging the axle means and releasably securing the axle means in a first location; said axle means being movable independently of the base member.

2. The portable luggage carrier of claim 1, further comprising a second latching means disposed on the base member for releasably securing the axle means in a second location.

3. The portable luggage carrier of claim 2, further comprising a third latching means disposed on the base member for releasably securing the axle means in a third location.

4. The portable luggage carrier of claim 1, further comprising strap means secured to the base member and to the handle member for releasably securing luggage to the carrier.

5. The portable luggage carrier of claim 1, further comprising co-operating means disposed on one of the base member and the handle member for co-acting with corresponding means disposed on luggage to releasably secure the luggage to the carrier.

6. The portable luggage carrier of claim 1, wherein the axle means pivots around the second end of the handle member from a first side of the handle member to a second side.

7. The portable luggage carrier of claim 6, wherein the handle member includes stop means secured thereto for limiting movement of the axle within approximately a 270° range.

8. A portable luggage carrier comprising: a handle member having a first and second end; a grip means disposed at the first end of the handle member; a base member pivotally connected to the handle member at the second end of the handle member for supporting luggage; wheel means disposed at the second end of the handle member for rolling on a subtending surface; axle means disposed at the second end of the handle member for supporting the wheel means, said wheel means being rotatably mounted on the axle means, said axle means defining an axis of rotation for said wheel means, said axle means being pivotally mounted to said handle member; and a movable first latching means secured tot he second end of the handle member for engaging the axle means and releasably securing the axle means in a first location; said axle means being movable independently of the base member.

9. The portable luggage carrier of claim 8, further comprising strap means secured to the base member and the handle member for releasably securing luggage to said carrier.

10. The portable luggage carrier of claim 8, further comprising co-operating means disposed on one of the base member and the handle member for co-acting with corresponding means disposed on luggage to releasably secure the luggage to the carrier.

11. The portable luggage carrier of claim 8, wherein the axis means pivots around the second end of the handle member from a first side of the handle member to a second side.

12. The portable luggage carrier of claim 11, wherein the handle member includes stop means secured thereto for limiting movement of the axle within approximately a 270° range.

* * * * *